United States Patent
Benevelli et al.

(10) Patent No.: US 12,038,024 B2
(45) Date of Patent: Jul. 16, 2024

(54) HYDRAULIC ARRANGEMENT FOR WORK VEHICLE COMPRISING A PRIORITY VALVE

(71) Applicant: CNH Industrial America LLC, New Holland, PA (US)

(72) Inventors: Alessandro Benevelli, Albinea (IT); Francesco Pintore, Modena (IT)

(73) Assignee: CNH Industrial America LLC, New Holland, PA (US)

(*) Notice: Subject to any disclaimer, the term of this patent is extended or adjusted under 35 U.S.C. 154(b) by 488 days.

(21) Appl. No.: 17/417,017

(22) PCT Filed: Dec. 18, 2019

(86) PCT No.: PCT/EP2019/085888
§ 371 (c)(1),
(2) Date: Jun. 21, 2021

(87) PCT Pub. No.: WO2020/127445
PCT Pub. Date: Jun. 25, 2020

(65) Prior Publication Data
US 2022/0074433 A1    Mar. 10, 2022

(30) Foreign Application Priority Data
Dec. 18, 2018  (IT) .......................... 102018000020131

(51) Int. Cl.
*F15B 11/16* (2006.01)
(52) U.S. Cl.
CPC ..... *F15B 11/162* (2013.01); *F15B 2211/6051* (2013.01); *F15B 2211/6313* (2013.01)
(58) Field of Classification Search
CPC .............. F15B 11/162; F15B 13/022; F15B 2211/6051; F15B 2211/6313; F15B 2211/781
See application file for complete search history.

(56) References Cited

U.S. PATENT DOCUMENTS 4,215,720 A * 8/1980 Becker .................. F15B 11/162
                                                    137/596.13
4,488,569 A * 12/1984 Rau .......................... B62D 5/07
                                                    137/101

(Continued)

FOREIGN PATENT DOCUMENTS

| DE | 19605992 A1 * | 8/1997 | ............ E02F 9/2221 |
| EP | 0 620 370 A1 | 10/1994 | |
| EP | 3 196 482 A2 | 7/2017 | |

OTHER PUBLICATIONS

DE19605992A1_t machine translation thereof. (Year: 1997).*
International Search Report and Written Opinion for PCT/EP2019/085888 dated Feb. 28, 2020.

*Primary Examiner* — Kenneth Bomberg
*Assistant Examiner* — Matthew Wiblin
(74) *Attorney, Agent, or Firm* — Rickard K. DeMille; Rebecca L. Henkel; Peter K. Zacharias

(57) ABSTRACT

A hydraulic arrangement is disclosed for distributing a fluid in pressure coming from a source of fluid in pressure among hydraulic units of a work vehicle. The hydraulic arrangement includes a priority valve configured to divide the flow of the fluid source between a subset of the hydraulic units on the base of an equivalent load sensing signal derived from the hydraulic units. The hydraulic arrangement further includes by-pass means fluidly interposed between the source and the subset of the hydraulic units and configured to allow direct passage of fluid by-passing priority valve from the source to the subset of the hydraulic units according to a predefined condition.

13 Claims, 6 Drawing Sheets

(56) References Cited

U.S. PATENT DOCUMENTS

| | | | |
|---|---|---|---|
| 9,084,388 B2 * | 7/2015 | Bitter | F15B 11/162 |
| 2008/0202110 A1 * | 8/2008 | Keuper | F15B 11/162 |
| | | | 60/420 |
| 2012/0152575 A1 | 6/2012 | Hand et al. | |
| 2016/0241168 A1 * | 8/2016 | Mirshekari | H02N 2/18 |

* cited by examiner

HYDRAULIC ARRANGEMENT FOR WORK VEHICLE COMPRISING A PRIORITY VALVE

CROSS REFERENCE TO RELATED APPLICATIONS

This application is a U.S. National Stage filing of International Application Serial No. PCT/EP2019/085888 entitled "HYDRAULIC ARRANGEMENT FOR WORK VEHICLE COMPRISING A PRIORITY VALVE," filed Dec. 18, 2019, which claims priority to Italian Application Serial No. 102018000020131, filed Dec. 18, 2018, each of which is incorporated by reference herein in its entirety for all purposes.

TECHNICAL FIELD

The present invention concerns a hydraulic arrangement for a work vehicle, in particular a hydraulic arrangement comprising a priority valve for a work vehicle, such as an agricultural vehicle.

BACKGROUND OF THE INVENTION

Work vehicles uses a fluid in pressure, e.g. oil, to operate a plurality of elements of the vehicles, such as transmission, steering, brakes and auxiliary valves.

To this aim, it is provided a source of such fluid in pressure, e.g. a pump, configured to supply the fluid into a distribution circuit configured to distribute the fluid in pressure among the aforementioned elements in function of their hydraulic load.

As disclosed in FIG. 1, a known distribution circuit 1' for a work vehicle comprises a source of fluid 2' directly fluidly, i.e. hydraulically, connected to a steering unit 3' of the work vehicle via a conduit 4' and fluidly connected to brake valve unit 5' and auxiliary valves unit 6' via a priority valve 7' fluidly interposed on a conduit 8'.

Priority valve 7' may be a three ways proportional valve configured to divide the fluid coming from source 2' between brake valve unit 5' via a conduit 8a' and auxiliary valves unit 5' via conduit 8b'. Such division corresponds to the five operations of the valve, i.e. a first operation in which no fluid may flow and therefore only steering unit 3' is using the fluid coming from source 2', a second and a third operations in which fluid may flow to only brake valve unit 5' and steering unit 3' and a fourth and fifth operations in which fluid may flow to all units 3', 5' and 6'.

Valve 7' is controlled hydraulically thanks to a pair of hydraulic load pressure signals acting on opposite sides of valve 7', a first signal 11' taken from conduit 8' upstream with respect to valve 7' and a second signal 12' taken as the greatest between signals coming from steering unit 3', brake valve unit 5', auxiliary valves unit 6'. Such greatest signal is chosen by selecting the greatest between a signal 12a' coming from brake valve unit 5' and a signal 12b' coming from steering unit 3' and then comparing such greatest signal with a signal 12c' coming from auxiliary valves unit 6'. Such comparison is made by respective shuttle valves 13' connecting signals 12a' and 12b' and the output between these latter with signal 12c'.

The balance between signal 11' and 12' allows valve 7' to be moved so as to be positioned in one of the above described positions. Since 11' is taken directly on conduit 8 upstream to steering unit 3', more such signal is greater, more fluid will pass to units 5' and 6', and, reversely, more signal 12' is greater, less fluid will pass to units 5' and 6', till such fluid will be zero.

A signal 14' derives from signal 12' coming from shuttle valve 13' and flows to source 2'. Source 2' is configured to increase pressure of provided fluid according to the received load sensing signal 14'. For example, source 2' may be a load sensing pump.

Further, priority valve 7' usually comprises an elastic member 9' configured to impart a preload force in favor of signal 12', such preload force must be additionally balanced by signal 11'.

However, if steering unit 3' requires low fluid, e.g. in a stop position in which the vehicle is doing some work operation e.g. through valves of the auxiliary unit 6', the remaining fluid will totally pass through priority valve 7' to be distributed to such auxiliary valves unit 6'.

Priority valve 7' normally presents great pressure drops due to orifices and conduits for managing fluid in pressure between different units and since the majority of the fluid will pass through priority valve 7', a great pressure drop is normally present in a work situation as described above.

Moreover, pump 2' should always apply a pressure increased as to overcome the preload force given by elastic member 9' which is configured to maintain priority valve 7 opened.

In conclusion, the presence of priority valve 7' generates great loss of efficiency due to pressure drops generated by the priority valve 7' itself and the preload of elastic member 9'.

Therefore, in view of the above, the need is felt of a distribution circuit for distributing the fluid in pressure among hydraulic elements of a work vehicle in function of their load, which is efficient and guarantees low pressure drops.

An aim of the present invention is to satisfy the above mentioned needs.

SUMMARY OF THE INVENTION

The aforementioned aim is reached by a hydraulic arrangement as claimed in the appended set of claims.

BRIEF DESCRIPTION OF DRAWINGS

For a better understanding of the present invention, a preferred embodiment is described in the following, by way of a non-limiting example, with reference to the attached drawings wherein.

DETAILED DESCRIPTION OF THE INVENTION

Figure 1:
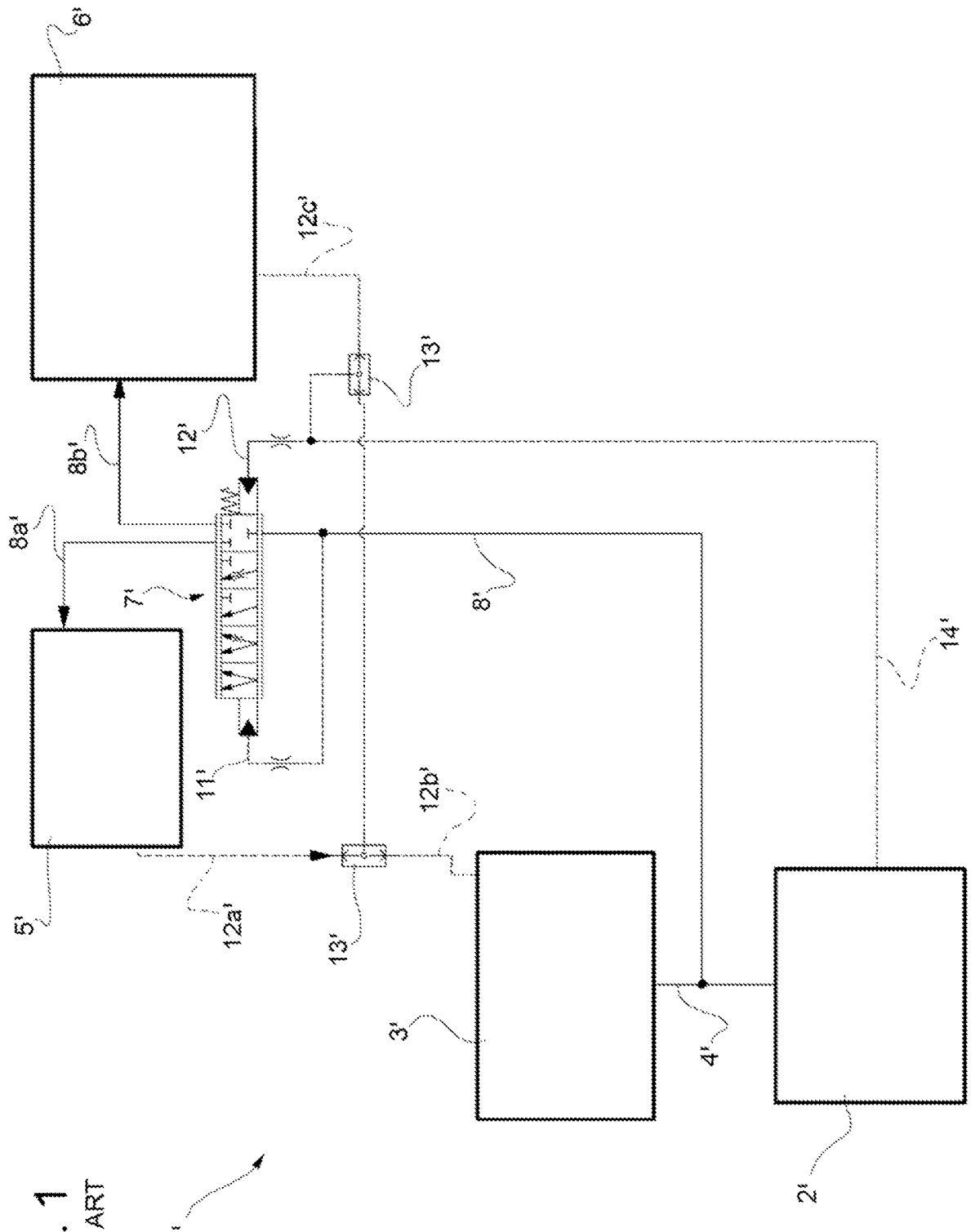
FIG. 1 is a hydraulic scheme showing a hydraulic distribution circuit for a work vehicle as known in the art.

The accompanying FIGS. 2 to 6 disclose different embodiments of a distribution circuit 1 for a work vehicle according to the invention, all distribution circuits 1 comprise a source of fluid 2 directly fluidly connected to a steering unit 3 of the work vehicle via a conduit 4 and fluidly connected to other hydraulic units such as brake valve unit 5 and auxiliary valves unit 6 by a conduit 8 on which it is fluidly interposed a priority valve 7.

Priority valve 7 may be a three ways proportional valve configured to divide the fluid coming from source 2 between brake valve unit 5 via conduit 8a and auxiliary valves unit 6 via conduit 8b. Such division corresponds to the five operations of the valve, i.e. a first operation in which no fluid may flow and therefore only steering unit 3 is using the fluid coming from source 2, a second and a third operations in which fluid may flow to only brake valve unit 5 and steering unit 3 and a fourth and fifth operations in which fluid may flow to all units 3, 5 and 6. Priority valve 7 further comprises an elastic member 9 configured to impart a preload force configured to maintain priority valve 7, if no other forces act on this latter, in the aforementioned first position.

Valve 7 is controlled hydraulically thanks to a pair of hydraulic load pressure signals acting on opposite sides of valve 7, a first signal 11 taken from conduit 8 upstream with respect to valve 7 and a second signal 12 taken as the greatest between signals coming from steering unit 3, brake valve unit 5, auxiliary valves unit 6. Such greatest signal is chosen by selecting the greatest between a signal 12a coming from brake valve unit 5 and a signal 12b coming from steering unit 3 and then comparing such greatest signal with a signal 12c coming from auxiliary valves unit 6. Such comparison is made by respective shuttle valves 13 connecting signals 12a and 12b and the output between these latter with signal 12c.

A signal 14 derives from signal 12 coming from shuttle valve 13 and flows to source 2. As known, source 2 is configured to increase pressure of provided fluid according to the received load sensing signal 14. For example, source 2 may be a load sensing pump.

The balance between signal 11 and 12 allow valve 7 to be moved so as to be positioned in one of the above described positions. Since 11 is taken directly on conduit 8 upstream to steering unit 3, more such signal is greater, more fluid will pass to units 5 and 6, and, reversely, more signal 12 is greater, less fluid will pass to units 5 and 6, till such fluid will be zero.

According to the invention, distribution circuit 1 further comprises by-pass means 20 configured to by-pass priority valve 7 so that fluid coming from source of fluid 2 in conduit 8 may flow directly, i.e. without passing through priority valve 7. towards at least one between units 5 or 6 according to a predefined condition, e.g. fluid pressure in conduit 8.

Figure 2:
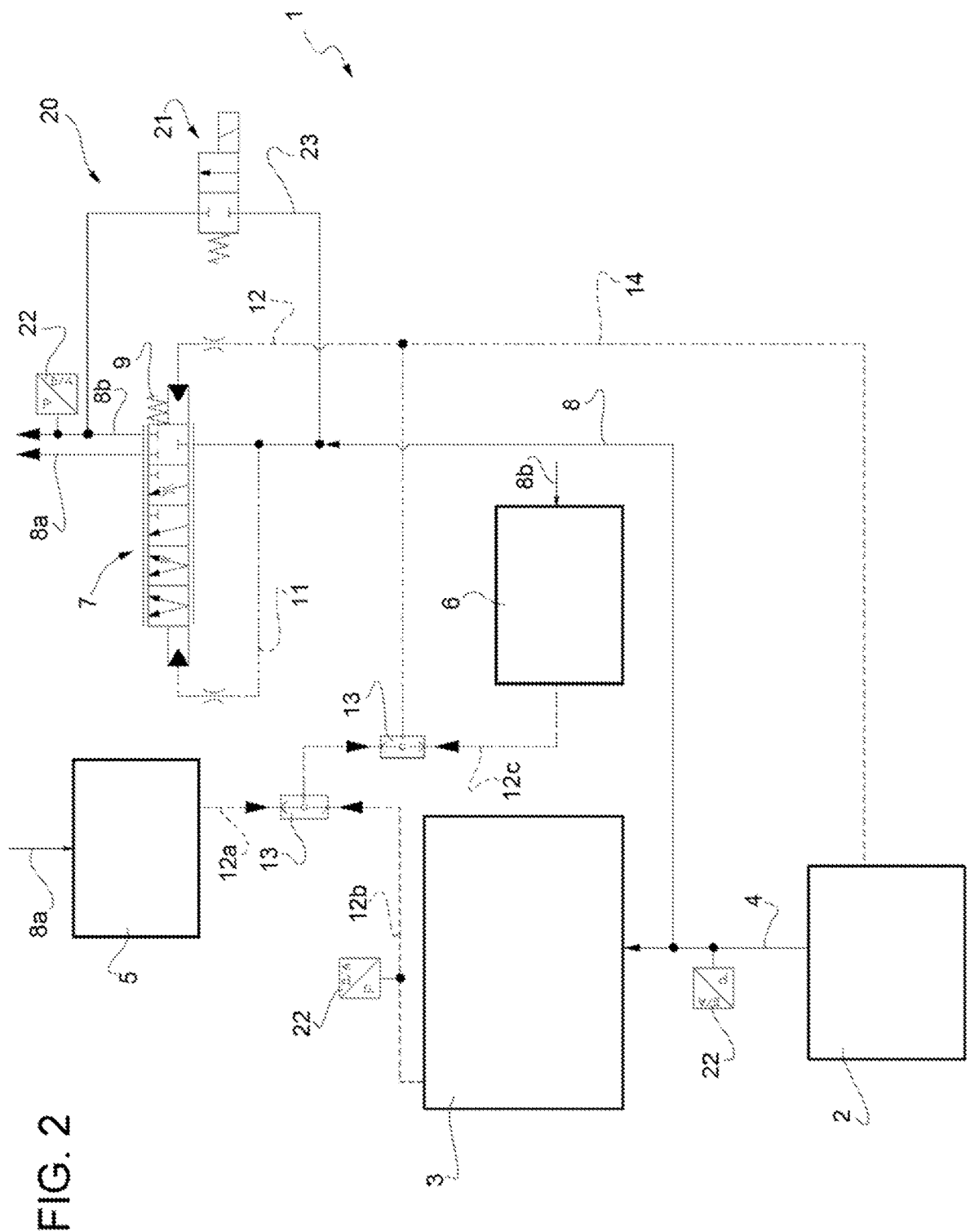
FIG. 2 is a hydraulic scheme showing a distribution circuit for a work vehicle according to a first embodiment of present invention.

FIG. 2 discloses a first embodiment of the invention, in which by-pass means 20 comprises a by-pass valve 21 fluidly interposed in parallel to priority valve 7 between conduit 8 and 8b on a conduit 23. By-pass valve 21 may be a two way-two positions electro actuated valve.

Electric actuation of valve 21 may be driven by an elaboration of electronic signals related to respective loads of units 3, 5, 6. Such loads may be measured by respective sensors 22 connected so as to achieve related pressure load sensing signals of the aforementioned units. According the disclosed architecture, a first sensor 22 is configured to detect signal 12b, a second sensor 22 is configured to detect pressure in conduit 4 and a third sensor 22 is configured to detect pressure in conduit 8b. Such sensor 22 may be an electro hydraulic pressure sensor of known typology.

Distribution circuit 1 further comprises therefore an electronic control unit (not shown) electronic connected, by wire or electromagnetically, to sensors 22 and to valve 21; such electronic control unit comprises memorizing and elaboration means configured to acquire, store and elaborate data related to pressure load sensing signals of units 2, 5, and 6 and control consequently movement of valve 21.

The operation of the above described first embodiment is the following.

The user may set a predefined condition of pressure load sensing signals related to units 2, 5 and 6. When the levels are below such condition, by-pass valve 21 is positioned so as not allow passage of fluid through this latter. Conversely then the aforementioned levels reach the preset condition, by-pass valve 21 is actuated by control unit and allow direct passage of fluid from conduit 8 to conduit 8b and then to auxiliary valve unit 6. In this way pressure drops due to priority valve 7 are avoided. In particular, such condition may be a value proportional to the pressure of the fluid in conduit 8.

Figure 3:
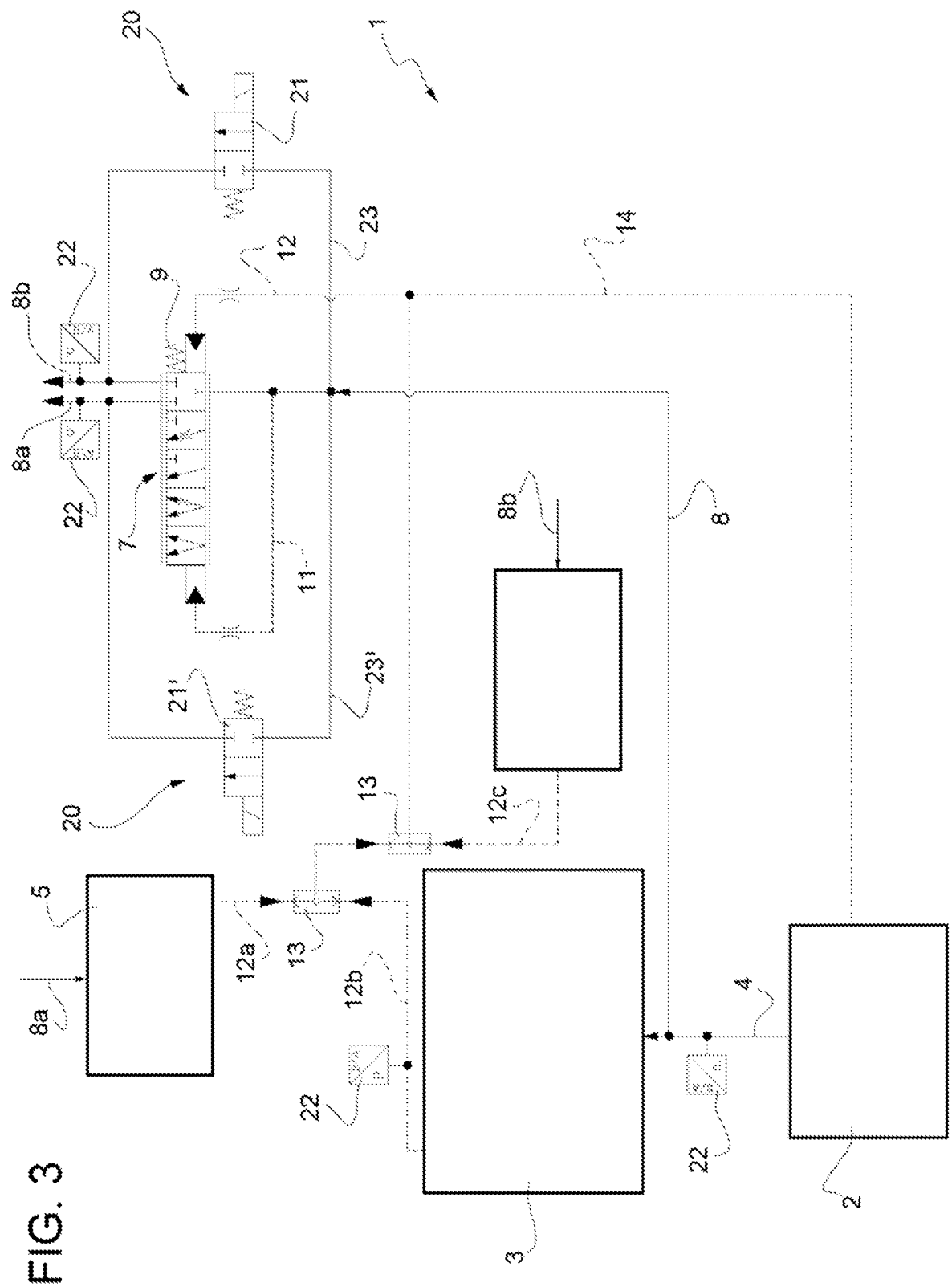
FIG. 3 is a hydraulic scheme showing a distribution circuit for a work vehicle according to a second embodiment of present invention.

FIG. 3 discloses a second embodiment of the invention differing by the first embodiment for the fact that by-pass means 20 comprises a first valve 21 fluidly interposed in parallel to priority valve 7 between conduits 8 and 8b on a conduit 23 and a second valve 21' fluidly interposed in parallel to priority valve 7 between conduits 8 and 8a on a conduit 23'. Both by-pass valves 21, 21' may be a two way-two positions electro actuated valves.

Electric actuation may be given by an elaboration of electronic signals related to respective loads of units 3, 5, 6. Such loads may be measured by respective sensors 22 and valves 21, 21' may be controlled by an electronic unit in the same manner as described for the first embodiment.

The operation of the above described second embodiment is the following.

The user may set a predefined condition of pressure load sensing signals related to units 2, 5 and 6. When the levels are below such condition, by-pass valves 21, 21' are positioned so as not allow passage of fluid through these latter. Conversely then the aforementioned levels reach the preset condition, by-pass valves 21, 21' are singularly or both actuated by control unit and allow direct passage of fluid from conduit 8 to conduit 8b and/or from conduit 8 to conduit 8a and then to the respective unit 5, 6. In this way pressure drops due to priority valve 7 are avoided.

Figure 4:
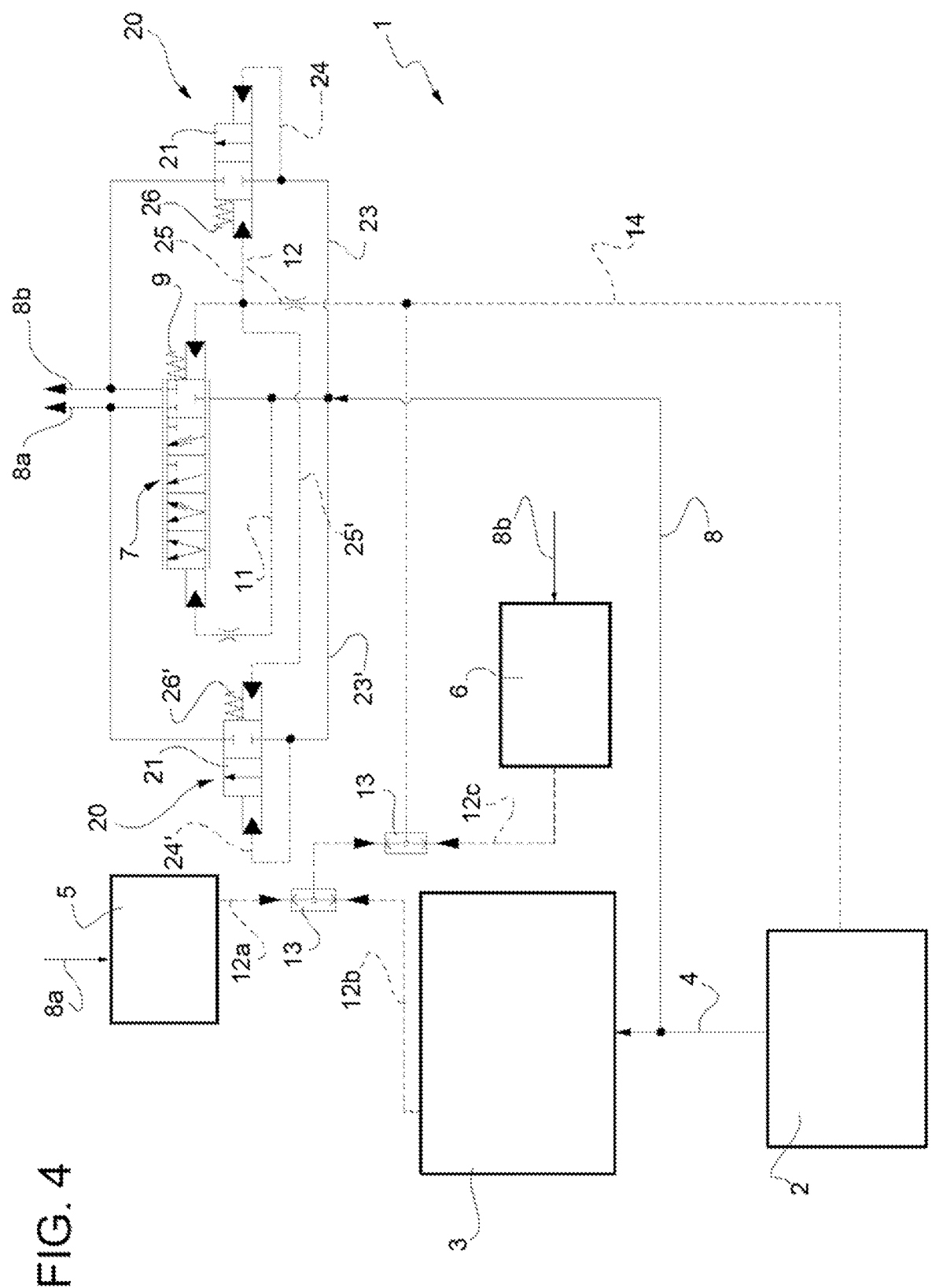
FIG. 4 is a hydraulic scheme showing a distribution circuit for a work vehicle according to a third embodiment of present invention.

FIG. 4 discloses a third embodiment of the invention, differing by the second embodiment for the fact valves 21, 21' are hydraulic controlled valves and no sensors 22 are present.

Indeed, valves 21, 21' are hydraulic actuated valves which can change position according to the balance of a first hydraulic signal 24, 24' and a second hydraulic signal 25, 25'. First hydraulic signal 24 of valve 21 is taken on conduit 23 downstream with respect to valve 21 and second hydraulic signal 25 of valve 21 is taken by second load hydraulic signal 12 which is directed to priority valve 7. Similarly, first hydraulic signal 24' of valve 21' is taken on conduit 23' downstream with respect to valve 21' and second hydraulic signal 25' of valve 21' is taken by second load hydraulic signal 12 which is directed to priority valve 7.

Valves 21, 21' further comprises elastic means 26, 26' configured to impart a preload which is configured to maintain the respective valve 21, 21' in open position.

Advantageously, preload imparted by elastic means 26 is different with respect to the preload imparted by elastic means 26'.

The operation of the above described third embodiment is the following.

As said, hydraulic load sensing signal 12 maintains, if greater than hydraulic load sensing signal 11, priority valve 7 opened so as to feed mainly steering unit 3. From such signal 12, signals 25 and 25' are spilled, thereby maintaining by-pass valves 21 opened.

When pressure in conduit 8 increases, signal 24, which is spilled by conduit 8, will increase while signal 12, and consequently signals 25, 25', will decreases. In this way, when signals 24, 24 overcome signals 25, 25' according to hydraulic load sensing signals of units 3, 5 and 6, by-pass valves 21 will allow passage of fluid through them latter and therefore to conduits 8a, 8b and then to units 5 and 6. Thanks to the presence of different levels of preload imparted by elastic means 26, 26' it is possible to set different levels for closing valves 21, 21' according to the necessity of units 5, 6.

Figure 5:
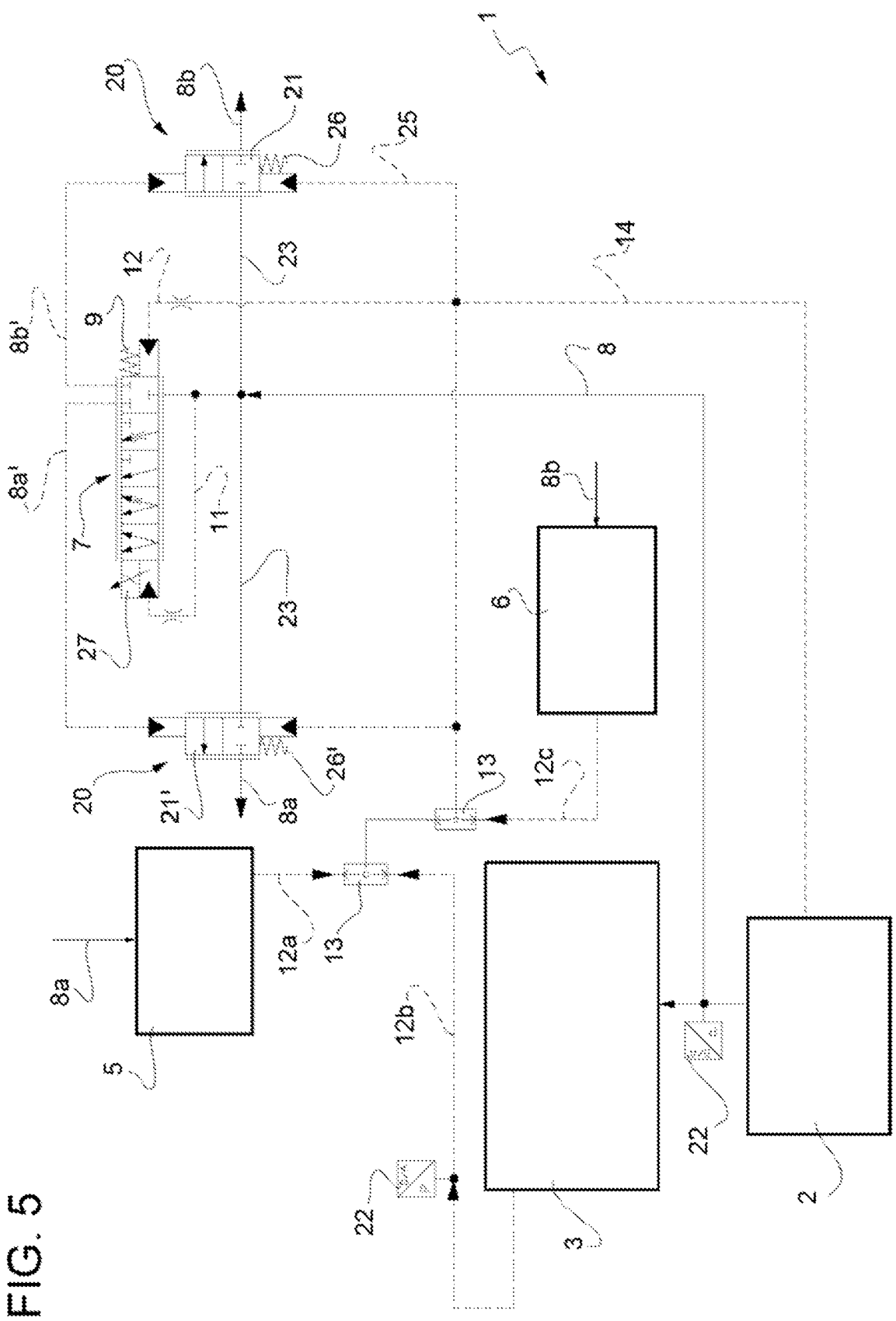
FIG. 5 is a hydraulic scheme showing a distribution circuit for a work vehicle according to a fourth embodiment of present invention.

FIG. 5 discloses a fourth embodiment of the invention, differing by the second embodiment for the fact valves 21, 21' are proportional hydraulic controlled valves thanks to a signal coming from priority valve 7.

In such configuration priority valve 7 is fluidly interposed on conduit 8, which connects this latter with source of fluid 2, and a couple of hydraulic signals conduit 8a', 8b' configured to control valves 21, 21' by balancing with respective hydraulic load sensing signals 25, 25' taken by second hydraulic signal 12.

Similarly as described for the third embodiment, both valves 21, 21' further comprises elastic means 26, 26' configured to impart a preload which is configured to maintain the respective valve 21, 21' in open position. Advantageously preload imparted by elastic means 26 is different with respect to the preload imparted by elastic means 26'.

Optionally, priority valve 7 may further comprise electric control means 27, preferably proportional electric control means, configured to control priority valve 7 independently with respect to entity of signals 8a', 8b', 25 and 25'. Accordingly circuit 1 comprises sensors 22 configured to detect pressure on conduit 8 and of hydraulic load sensing signal 12a so as to allow control, in known way thanks to a control unit, of priority valve 7.

The operation of the above described fourth embodiment is the following.

As said, hydraulic load sensing signal 12 maintains, if greater than hydraulic load sensing signal 11, priority valve 7 opened so as to feed mainly steering unit 3. From such signal 12, signals 25 and 25' are spilled, thereby maintaining by-pass valves 21 opened.

When pressure in conduit 8 increases, signals 8a, 8b will increase till overcoming signals 25, 25' and therefore by-pass valves 21, 21' will allow passage of fluid through them latter and therefore to conduits 8a, 8b and then to units 5 and 6.

Thanks to the presence of different levels of preload imparted by elastic means 26, 26' it is possible to set different levels for closing valves 21, 21' according to the necessity of units 5, 6.

If, for any reason, the user would like to force the passage of fluid in pressure to units 5 and 6, he could act on electric control means 27 so as to force movement of priority valve 7.

Figure 6:
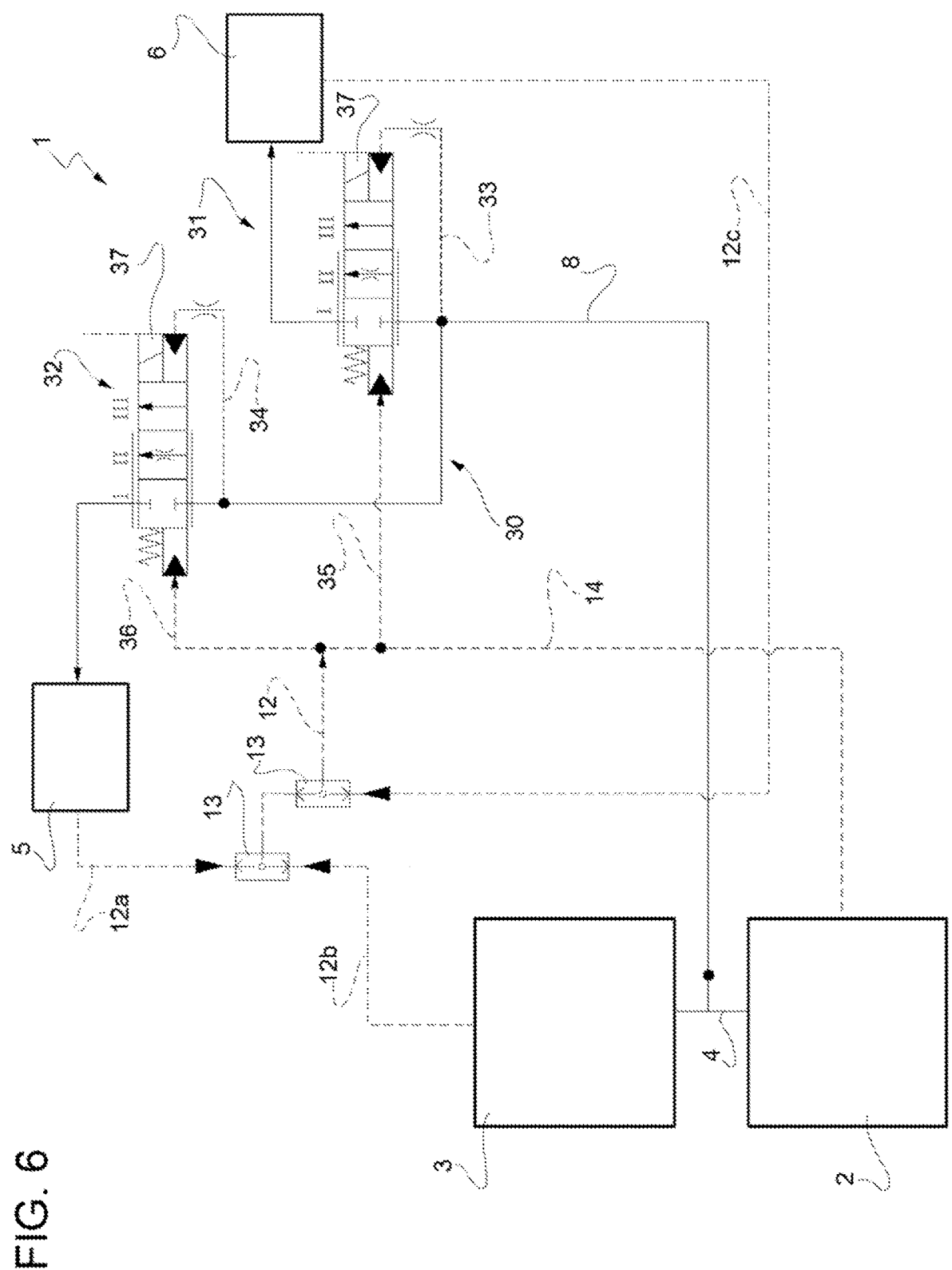
FIG. 6 is a hydraulic scheme showing an distribution circuit for a work vehicle according to an alternative embodiment of the present invention.

FIG. 6 depicts an alternative embodiments of the present invention of distribution circuit 1 comprising a source of fluid 2 directly fluidly connected to a steering unit 3 of the work vehicle via a conduit 4 and fluidly connected to other hydraulic units such as brake valve unit 5 and auxiliary valves unit 6 by a conduit 8 on which it is fluidly interposed a selection group 30.

Selection group 30 may comprise a pair or valve 31, 32 both fluidly interposed in parallel on conduit 30. In particular selection group 30 may comprise a first valve 31 fluidly interposed between conduit 8 and auxiliary valve unit 6 and a second valve 32 fluidly interposed between conduit 8 and auxiliary valve unit 6 downstream with respect to first valve 31.

Both valves 31, 32 may be a two-ways proportional valve configured to assume three operative states, a first state I in which no fluid may flow towards the respective unit 5, 6, a third state III in which a maximum flow may pass though valve 31, 32 towards the aforementioned unit and a second state II in which an intermediate flow between the zero and maximum flow of states I and II may pass towards the respective unit 5, 6.

Valves 31, 32 may be hydraulically controlled thanks to a pair of hydraulic load pressure signals acting on opposite sides of these latter. In particular, a first signal 33, 34 taken from conduit 8 upstream with respect to the respective valve 31, 32 and a second signal 35, 36 taken as the greatest signal 12 between signals coming from steering unit 3, brake valve unit 5, auxiliary valves unit 6.

Such greatest signal is chosen by selecting the greatest between a signal 12a coming from brake valve unit 5 and a signal 12b coming from steering unit 3 and then comparing such greatest signal with a signal 12c coming from auxiliary valves unit 6. Such comparison is made by respective shuttle valves 13 connecting signals 12a and 12b and the output between these latter with signal 12c.

A signal 14 derives from signal 12 coming from shuttle valve 13 and flows to source 2. As known, source 2 is configured to increase pressure of provided fluid according to the received load sensing signal 14. For example, source 2 may be a load sensing pump.

The balance between signals 33,34 and 35,36 allows valves 31, 32 to be moved so as to be positioned in one of the above described positions I to III. Since signals 33, 34 are taken directly on conduit 8 upstream to steering unit 3, more such signal is greater, more fluid will pass to units 5 and 6, and, reversely, more signal 12 is greater, less fluid will pass to units 5 and 6, till such fluid will be zero.

Valves 31, 32 may further comprise electric control means 37, preferably proportional electric control means, configured to control these latter independently with respect to entity of signals 33, 34 and 35, 36. Accordingly electronic control means 37 may actuate valves 31, 32 independently according to an electronic signal given by the user or sensors according to a logic given by a related control unit (not shown).

The operation of the above described alternative embodiment is the following.

The user may set a predefined condition of pressure load sensing signals related to units 2, 5 and 6. When the levels are below such condition, valves 31, 32 do not allow passage of fluid. Conversely then the aforementioned levels reach the preset condition, valves 31, 32 are actuated and allow passage of fluid from conduit 8 to units 5, 6 till maximum free flow is achieved. In this way pressure drops due to known priority valve 7 are avoided.

In view of the foregoing, the advantages of the hydraulic arrangement 1 according to the invention are apparent.

Thanks to the presence of by-pass 20 it is possible to minimize pressure drops due to priority valve 7 according to a preset hydraulic load representing a charge status of units 5 and/or 6.

Accordingly, dimensions of priority valve 7 may be reduced since the majority of fluid, when necessary, will pass through by-pass means 20.

Moreover, by-pass means 20 allow a versatile control since they may comprise any typology of valves 21 and related control according to user's necessity and possibility.

Distribution circuit 1 is moreover less noisy and allows to reduce consume of source of fluid 2, i.e. of the pump, because this latter has not to waste energy for overcoming known pressure drops due by standard priority valves 7.

The embodiment of FIG. 6 moreover allows to substitute totally priority valve 7 with two different valves 31, 32 which can be actuated separately and which are less expensive and occupies less space.

It is clear that modifications can be made to the described hydraulic arrangement 1 which do not extend beyond the scope of protection defined by the claims.

First, valves 21 and their control may be varied according to user's necessity.

Moreover, the above described embodiments may be combined together to define other possible equivalent alternatives.

The invention claimed is:

1. A hydraulic arrangement for distributing a pressurized fluid coming from a source of the pressurized fluid among a plurality of hydraulic units of a work vehicle, the hydraulic arrangement comprising
   a priority valve configured to divide a flow of the pressurized fluid from the source between the plurality of hydraulic units based on an equivalent load sensing signal derived from the plurality of hydraulic units; and
   at least one bypass valve fluidly interposed on a conduit directly fluidly connecting the source and at least one respective unit of the plurality of hydraulic units and configured to allow direct passage of the pressurized fluid, by-passing the priority valve, from the source to the at least one respective unit of the plurality of hydraulic units according to a predefined condition;
   wherein the at least one bypass valve is a two ways-two positions valve, a ON-OFF valve, or an ON-OFF proportional valve.

2. The hydraulic arrangement according to claim 1, wherein the predefined condition is proportional to a pressure of the pressurized fluid coming into the priority valve from the source.

3. The hydraulic arrangement according to claim 1, wherein the at least one bypass valve is the two ways-two positions valve.

4. The hydraulic arrangement according to claim 1, wherein the at least one bypass valve is the ON-OFF valve.

5. The hydraulic arrangement according to claim 1, wherein the at least one bypass valve is the ON-OFF proportional valve.

6. The hydraulic arrangement according to claim 1, wherein the at least one bypass valve is preloaded to oppose movement of the at least one bypass valve.

7. A hydraulic arrangement for distributing a pressurized fluid coming from a source of the pressurized fluid among a plurality of hydraulic units of a work vehicle, the hydraulic arrangement comprising:
   a priority valve configured to divide a flow of the pressurized fluid from the source between the plurality of hydraulic units based on an equivalent load sensing signal derived from the plurality of hydraulic units; and
   at least one bypass valve fluidly interposed on a conduit directly fluidly connecting the source and at least one respective unit of the plurality of hydraulic units and configured to allow direct passage of the pressurized fluid, by-passing the priority valve, from the source to the at least one respective unit of the plurality of hydraulic units according to a predefined condition;
   wherein at least a hydraulic control signal of a hydraulic control of the at least one bypass valve comes from the source and passes through the priority valve, the priority valve being controlled hydraulically by a balance between a first hydraulic load sensing signal resulting as the greatest of a plurality of hydraulic load pressure signals taken from the plurality of hydraulic units and a second hydraulic load signal taken from the fluid coming from the source.

8. A hydraulic arrangement for distributing a pressurized fluid coming from a source of the pressurized fluid among a plurality of hydraulic units of a work vehicle, the hydraulic arrangement comprising:
   a priority valve configured to divide a flow of the pressurized fluid from the source between the plurality of hydraulic units based on an equivalent load sensing signal derived from the plurality of hydraulic units; and
   at least one bypass valve fluidly interposed on a conduit directly fluidly connecting the source and at least one respective unit of the plurality of hydraulic units and configured to allow direct passage of the pressurized fluid, by-passing the priority valve, from the source to the at least one respective unit of the plurality of hydraulic units according to a predefined condition;
   wherein at least a hydraulic control signal of a hydraulic control of the at least one bypass valve comes from the source and passes through the priority valve, the priority valve comprise electric means configured to drive this latter.

9. A hydraulic arrangement for distributing a pressurized fluid coming from a source of the pressurized fluid among a plurality of hydraulic units of a work vehicle, the hydraulic arrangement comprising:
   a priority valve configured to divide a flow of the pressurized fluid from the source between the plurality of hydraulic units based on an equivalent load sensing signal derived from the plurality of hydraulic units;
   at least one bypass valve fluidly interposed on a conduit directly fluidly connecting the source and at least one respective unit of the plurality of hydraulic units and configured to allow direct passage of the pressurized fluid, by-passing the priority valve, from the source to the at least one respective unit of the plurality of hydraulic units according to a predefined condition;
   a sensor configured to detect a physical quantity related to a load signal of the at least one respective unit of the plurality of hydraulic units; and
   an electronic control unit electrically connected to the sensor and the at least one bypass valve and configured to control the at least one bypass valve based on data acquired by the sensor.

10. The hydraulic arrangement according to claim 9, wherein the sensor is a pressure sensor.

11. A hydraulic arrangement for distributing a pressurized fluid coming from a source of the pressurized fluid among a plurality of hydraulic units of a work vehicle, the hydraulic arrangement comprising:
- a plurality of valves, each of the plurality of valves being configured to regulate passage of the pressurized fluid from the source to at least one respective unit of the plurality of hydraulic units based on an equivalent load sensing signal derived from the plurality of hydraulic units and a predefined condition;
- wherein the plurality of valves are electrically actuatable based on an electric signal.

12. The hydraulic arrangement according to claim 11, wherein the predefined condition is proportional to a pressure of the pressurized fluid coming from the source.

13. The hydraulic arrangement according to claim 11, wherein the plurality of valves are proportional valves.

* * * * *